(12) United States Patent
Shih et al.

(10) Patent No.: US 11,300,447 B2
(45) Date of Patent: Apr. 12, 2022

(54) LIGHT SOURCE FOR VARIABLE PATH LENGTH SYSTEMS

(71) Applicant: C Technologies Inc., Bridgewater, NJ (US)

(72) Inventors: I-Tsung Shih, Bridgewater, NJ (US); Mark Salerno, Bridgewater, NJ (US); Matthew Muller, Bridgewater, NJ (US); Yusheng Zhang, Bridgewater, NJ (US); Peter Halatin, Bridgewater, NJ (US); Vladimir Gorbunov, Bridgewater, NJ (US)

(73) Assignee: C Technologies Inc, Bridgewater, NJ (US)

( * ) Notice: Subject to any disclaimer, the term of this patent is extended or adjusted under 35 U.S.C. 154(b) by 0 days.

(21) Appl. No.: 16/935,454

(22) Filed: Jul. 22, 2020

(65) Prior Publication Data
US 2022/0026272 A1 Jan. 27, 2022

(51) Int. Cl.
*G01J 3/02* (2006.01)
*G01J 3/10* (2006.01)

(52) U.S. Cl.
CPC ............ *G01J 3/0218* (2013.01); *G01J 3/0216* (2013.01); *G01J 3/10* (2013.01)

(58) Field of Classification Search
None
See application file for complete search history.

(56) References Cited

U.S. PATENT DOCUMENTS

| | | | | |
|---|---|---|---|---|
| 4,703,175 A | * | 10/1987 | Salour | G01K 11/14 250/227.23 |
| 5,184,193 A | * | 2/1993 | LeFebre | G01J 3/08 356/325 |
| 5,450,512 A | * | 9/1995 | Asakura | G02B 6/12007 385/48 |
| 9,784,619 B2 | * | 10/2017 | Zhu | G01J 3/0237 |
| 9,939,373 B2 | | 4/2018 | Salerno et al. | |
| 10,132,787 B2 | * | 11/2018 | Levels | G01N 33/14 |
| 2007/0131060 A1 | * | 6/2007 | Kelsey | G01N 21/31 76/104.1 |

(Continued)

OTHER PUBLICATIONS

International Search Report and Written Opinion dated Aug. 30, 2021 for PCT/US2021/041423 filed Jul. 13, 2021.

*Primary Examiner* — Shawn Decenzo
(74) *Attorney, Agent, or Firm* — Kacvinsky Daisak Bluni PLLC

(57) ABSTRACT

A system for determining a characteristic of a sample includes a light source for directing light into an input of a spectrometer. The spectrometer splits the received light into light outputs each having a different wavelength. An active wavelength selection module (AWSM) includes an optical receiving component (ORC). An actuator is coupled to the spectrometer and/or the ORC to adjust a relative position between the spectrometer and the AWSM so that light is receivable by the ORC from a selected one of the plurality of light outputs. The ORC is configured to direct the received light to a sample. A collector is positioned to collect a portion of light that passes through the sample, and to deliver the collected light to an analysis module. The analysis module is configured to determine a quantity of light transmitted through the sample and to correlate transmitted light with a characteristic of the sample.

23 Claims, 6 Drawing Sheets

(56) References Cited

U.S. PATENT DOCUMENTS

2012/0247669 A1* 10/2012 Matsudo .......... H01L 21/67248
156/345.27
2012/0251759 A1* 10/2012 Yamawaku ....... H01L 21/67248
428/58

* cited by examiner

LIGHT SOURCE FOR VARIABLE PATH LENGTH SYSTEMS

BACKGROUND OF THE DISCLOSURE

Field of the Disclosure

Embodiments of the disclosure relate generally to light sources for use in optical spectroscopy, and more particularly to an improved, high resolution and compact light source for use with a variable path length sampling device that facilitates spectroscopic measurements.

Discussion of Related Art

Spectroscopic analysis is a broad field in which the composition and properties of a material in any phase, gas, liquid, solid, are determined from the electromagnetic spectra arising from the interaction (e.g., absorption, luminescence, emission, etc.) with energy. One aspect of spectrochemical analysis, known as spectroscopy, involves interaction of radiant energy with the material of interest. The particular methods used to study such matter-radiation interactions define many sub-fields of spectroscopy.

Absorption spectroscopy measures the optical absorption spectra of liquid substances. The absorption spectra is the distribution of light attenuation (due to absorbance) as a function of light wavelength. For example, in a simple spectrometer, the sample substance which is to be studied is placed in a transparent container, also known as a cuvette or sample cell. Electromagnetic radiation (light) of a known wavelength, $\lambda$, (e.g., ultraviolet, infrared, visible, etc.) and intensity I is incident on one side of the transparent container (e.g., cuvette or sample cell). A detector, which measures the intensity of the exiting light, is placed on the opposite side of the transparent container (e.g., cuvette or sample cell). The length that the light propagates through the sample is the distance d.

Standard UV/visible spectrometers utilize standard cuvettes which have 1 cm path lengths and normally hold 50 to 2000 µL of sample. For a sample consisting of a single homogeneous substance with a concentration c, the light transmitted through the sample will follow a relationship known as Beer's Law:

$$A = \varepsilon c l$$

where A is the absorbance (also known as the optical density (OD) of the sample at wavelength $\lambda$; where OD is the −log of the ratio of transmitted light to the incident light; $\varepsilon$ is the absorptivity or extinction coefficient (normally a constant at a given wavelength $\lambda$); c is the concentration of the sample; and l is the path length of light through the sample.

Spectroscopic measurements of solutions are widely used in various fields. Often the compound of interest in solution is highly concentrated. For example, certain biological samples, such as proteins, DNA or RNA, are often isolated in concentrations that fall outside the linear range of the spectrometer when absorbance is measured. Therefore, dilution of the sample is often required to measure an absorbance value that falls within the linear range of the instrument. That is, generally speaking, if the concentration of the sample cell is too high, the instrument isn't sensitive enough to determine the concentration (e.g., high concentration samples equate to high absorption of the emitted light thus low amounts of light reach the detector). As a result, users typically dilute the solution to reduce the concentration to reach a point where a sufficient amount of light reaches the detector.

However, often times, multiple dilutions of the sample are required, which leads to both dilution errors and the removal of the sample diluted for any downstream application. As a result, it is desirable to take existing samples with no knowledge of the possible concentration and measure the absorption of these samples without dilution.

One approach or solution to prevent, or at least minimize dilution, is to utilize a variable path length spectrometer. U.S. Pat. No. 9,939,373, the contents of which are incorporated herein by reference in its entirety, discloses a Variable Path Length (VPL) device, which dynamically adapts parameters in response to real time measurements via software control to expand the dynamic range of a conventionally spectrometer such that samples of almost any concentration can be measured without dilution of concentration of the original sample. In addition, according to one or more methods disclosed therein, the path length is not required to be known to determine the concentration of samples.

That is, U.S. Pat. No. 9,939,373 discloses interactive variable path length devices and methods for spectroscopic measurement of a sample. In use, the instruments can be used to measure the concentration of very concentrated samples by providing path lengths around 0.2 µm and above. Such small path lengths permit the measurement of samples too concentrated to be measured by conventional spectrometers. Furthermore, the instruments and methods provide spectrum scans in two or three different path length zones. This enables users to determine optimal absorbance peaks in a sample in a single run. As such, information on optimization of concentration measurements can be provided by comparing absorbance peak data at multiple path lengths and multiple wavelengths as these values can be different due to the contents in the sample. This is in contrast to instruments that use standard fixed path length cuvettes, which cannot present all of this data at the same time.

Referring to FIG. 1, the variable path length instrument 10 for determining a concentration of a sample at multiple path lengths includes a probe 20 including a probe tip 22, a sample vessel 30, a mechanism for moving the probe tip and sample vessel relative to one another (e.g., a motor 40 operably linked to the sample vessel 30 such that the sample vessel 30 can be moved relative to the probe 20 to provide variable path lengths), a detector 50 that can detect electromagnetic radiation, and appropriate software for path length control and measurement parameters. In use, the detector 50 is arranged and configured substantially perpendicular to the electromagnetic radiation emanating from the probe 20. A light source (not shown) is attached to the upper end of the probe 20 (e.g., end of the probe 20 opposite the probe tip 22) while the lower end of the probe tip 22 contacts or is immersed in the sample cell positioned within the sample vessel 30. The probe tip 22 and the sample vessel 30 are movable relative to each other (e.g., sample vessel 30 may be stationary and the probe 20 may be movable relative to the sample vessel 30, or vice versa, or a combination of both (i.e., both the sample vessel 30 and the probe 20 may be rendered movable)). In use, by moving the probe 20 relative to the sample vessel 30, the path length is adjustable. For example, for higher concentrated samples, a smaller path length can be utilized to obtain the desired range of absorbance values.

In use, a sample is placed within the sample vessel 30. The probe 20 is then moved so that the probe tip 22 contacts the bottom of the sample vessel 30 immersing the probe top 22 within the sample. Thereafter, the probe 20 is moved relative to the sample vessel 30 such that the probe 20 moves from the bottom of the sample vessel 30 through the sample by a predetermined increment such that a preselected path length through the solution is obtained. An absorbance reading at a predetermined wavelength is taken. The steps of moving the probe 20 relative to the sample and taking a measurement are repeated. A regression line from the absorbance and path length are generated including obtaining a slope of the regression line. Finally, the concentration of the sample is determined by dividing the slope of the regression line by the extinction coefficient of the sample.

One disadvantage of current systems is that the light sources used with such systems are bulky. For example, current light sources can have overall dimensions of 20"×22"×8", which is larger than desired for what can often be cramped analysis spaces. Thus, a compact light source that can be directly integrated into the variable path length instrument, or other analytical instrument, would be advantageous.

Another disadvantage of current systems is that the light sources used with such systems do not provide light at a desired high resolution.

It is with these disadvantages in mind that the present disclosure is provided.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a system for determining a characteristic of a sample. In one embodiment, the system comprises a light source positioned to direct light into an input of a spectrometer, the spectrometer positioned to receive the light from the light source and to split the light into a plurality of light outputs each having a different wavelength; an active wavelength selection module (AWSM) comprising an optical receiving component (ORC); an actuator coupled to at least one of the spectrometer and the ORC to selectively adjust a relative position between the spectrometer and the AWSM so that light is receivable by the ORC from a selected one of the plurality of light outputs, wherein the ORC is configured to direct the received light to a sample; and a collector positioned to collect a portion of light that passes through the sample, and to deliver the collected light to an analysis module; wherein the analysis module is configured to determine a quantity of light transmitted through the sample and to correlate transmitted light with a characteristic of the sample.

In some embodiments the actuator is configured to selectively adjust a relative position between the ORC and the spectrometer in first and second mutually perpendicular directions so that the ORC receives a selected one of the plurality of light outputs.

In one embodiment, the ORC comprises a single optical fiber or an optical fiber array.

In one embodiment, the characteristic of the sample is a concentration, an extinction coefficient, a scattering, or a color, of a targeted compound in the sample.

In one embodiment, the targeted compound is at least one of a protein, an antibody, a virus, a gene therapy, a cell therapy, a bovine serum albumen (BSA), a vaccine, a virus from Gene and Cell therapy drugs, DNA, RNA, a cell ratio, an antibody conjugates, a beer, a wine, and a surfactant.

In one embodiment, the analysis module includes a variable path-length instrument.

In one embodiment, a scan length of the actuator is from 100 nanometers (nm) to 1 millimeter (mm) of received light from the spectrometer.

In another embodiment, a wavelength selection mechanism for use in sample analysis is disclosed. In one embodiment, the wavelength selection mechanism comprises a spectrometer for receiving light from a light source and for outputting light at a plurality of different wavelengths; an optical receiving component for receiving the light outputted by the spectrometer; and an actuator coupled to one of the optical receiving component and the spectrometer, the actuator configured to selectively adjust a relative position between the optical receiving component and the spectrometer such that the optical receiving component receives a selected one of the plurality of light outputs, the selected one of the plurality of light outputs having a wavelength for determining a targeted compound in the sample.

In some embodiments, the actuator is configured to selectively adjust a relative position between the ORC and the spectrometer in first and second mutually perpendicular directions so that the ORC receives a selected one of the plurality of light outputs.

In one embodiment, the ORC comprises a single optical fiber or an optical fiber array.

In one embodiment, the characteristic of the sample is at least one of a concentration, an extinction coefficient, a scattering, or a color, of a targeted compound in the sample.

In one embodiment, the targeted compound is at least one of a protein, an antibody, and a virus.

In one embodiment, the analysis module includes a variable path-length instrument.

In one embodiment, a scan length of the actuator is from 100 nm to 1 mm of received light from the spectrometer.

In another embodiment, a method for determining a characteristic of a sample is disclosed. In one embodiment, the method comprises: directing a light into an input of a spectrometer; at the spectrometer, splitting the light into a plurality of light outputs each having a different wavelength; projecting the plurality of light outputs onto an active wavelength selection module (AWSM); moving at least one of the spectrometer and an optical receiving component (ORC) of the AWSM with respect to each other such that the ORC receives light from a selected one of the plurality of light outputs; directing the received light to a sample; collecting a quantity of the received light that passes through the sample; directing the collected quantity of the received light to an analysis module; and at the analysis module, correlating the collected light with a characteristic of the sample.

In some embodiments, moving at least one of the spectrometer and the ORC comprises adjusting a relative position between the ORC and the spectrometer in first and second mutually perpendicular directions so that the ORC receives a selected one of the plurality of light outputs.

In one embodiment, the ORC comprises a single optical fiber or an optical fiber array.

In one embodiment, the characteristic of the sample is at least one of a concentration, an extinction coefficient, a scattering, or a color, of a targeted compound in the sample.

In one embodiment, the targeted compound is at least one of a protein, an antibody, a virus, a gene therapy, a cell therapy, a bovine serum albumen (BSA), a vaccine, a virus from Gene and Cell therapy drugs, DNA, RNA, a cell ratio, an antibody conjugates, a beer, a wine, and a surfactant.

In one embodiment, the analysis module includes a variable path-length instrument.

In one embodiment, a scan length of the actuator is from 100 nm to 1 mm of received light from the spectrometer.

In another embodiment, a method for calibrating a selection mechanism for use in sample analysis is disclosed. The method comprises: at a spectrometer, splitting input light into a plurality of light outputs each having a different wavelength; projecting the plurality of light outputs onto an optical receiving component (ORC) of an active wavelength selection module (AWSM); moving at least one of the spectrometer and the ORC by a predetermined amount such that the ORC receives light from a selected one of the plurality of light outputs; directing the received light to a calibration module; at the calibration module, correlating a position of the ORC with a wavelength of the light received at the position; in a memory device, saving the position of the ORC and the wavelength of the light received at the position; and repeating the projecting, moving, directing, correlating and saving steps to obtain a calibration matrix that correlates a plurality of positions of the ORC with a plurality of wavelengths of light received at each of the plurality of positions. In some embodiments, moving at least one of the spectrometer and the ORC by a predetermined amount comprises moving at least one of the spectrometer and the ORC in first and second mutually perpendicular directions

BRIEF DESCRIPTION OF THE DRAWINGS

The accompanying drawings illustrate preferred embodiments of the disclosed method so far devised for the practical application of the principles thereof, and in which.

Figure 1:
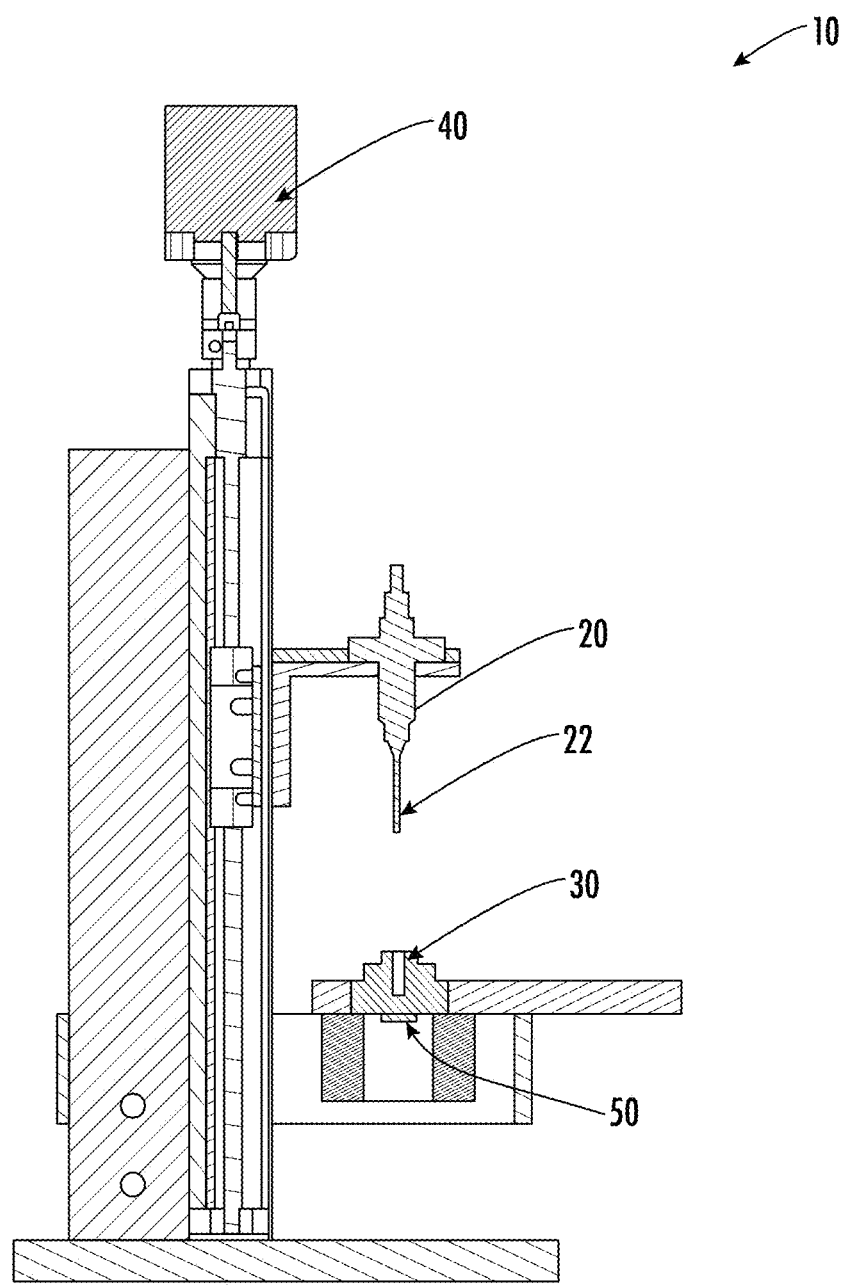
FIG. 1 is a schematic view of an example embodiment of a known variable path length system.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein.

DESCRIPTION OF EMBODIMENTS

Various features, aspects, or the like of a compact light source system for use with, for example, a variable path length (VPL) system or instrument to determine a characteristic of a sample will now be described more fully hereinafter with reference to the accompanying drawings, in which one or more aspects or features of the light source system will be shown and described. It will be appreciated that although the compact light source system will be described in relation to a VPL system, that its application is not so limited, and the compact light source system can be used with any of a variety of other systems, a non-limiting example of which is a fluorometer, that can be used to analyze components or characteristics of components in a sample under analysis. It should be appreciated that the various features, aspects, or the like may be used independently of, or in combination, with each other. It will be appreciated that a light source system as disclosed herein may be embodied in many different forms and should not be construed as being limited to the embodiments set forth herein. Rather, these embodiments are provided so that this disclosure will convey certain aspects or features of the light source system to those skilled in the art. In the drawings, like numbers refer to like elements throughout unless otherwise noted.

Disclosed herein is an example of an embodiment of a light source system used to supply light to a VPL system such as that illustrated in FIG. 1 and disclosed in U.S. Pat. No. 9,939,373, the contents of which are incorporated herein in its entirety. In use, the light source system may be used to supply light to the VPL system to measure one or more parameters of a sample. In one embodiment, the sample may be a liquid and the one or more parameters may be measured without diluting the sample. For example, UV spectrometer light may be used to measure the property of the sample cell including, for example, to measure concentrations of protein and antibodies within the sample cell. However, it should be appreciated that the system may be used to measure any of a variety of characteristics of a sample, such as extinction coefficient, scattering, color, particle size, cell count, and purity. It will be appreciated, however, that the system is not limited to measuring the aforementioned characteristics and can be used to measure any appropriate physical property of the material under observation. In addition, it should be appreciated that the system may be used to measure any of a variety of targeted compounds including, but not limited to, for example, vaccines, viruses from Gene and Cell therapy drugs, DNA, RNA, cell ratios, antibody conjugates, beer, wine, surfactants, and the like. As such, the present disclosure should not be limited to any particular sample cell and/or characteristic unless expressly claimed.

Figure 2:
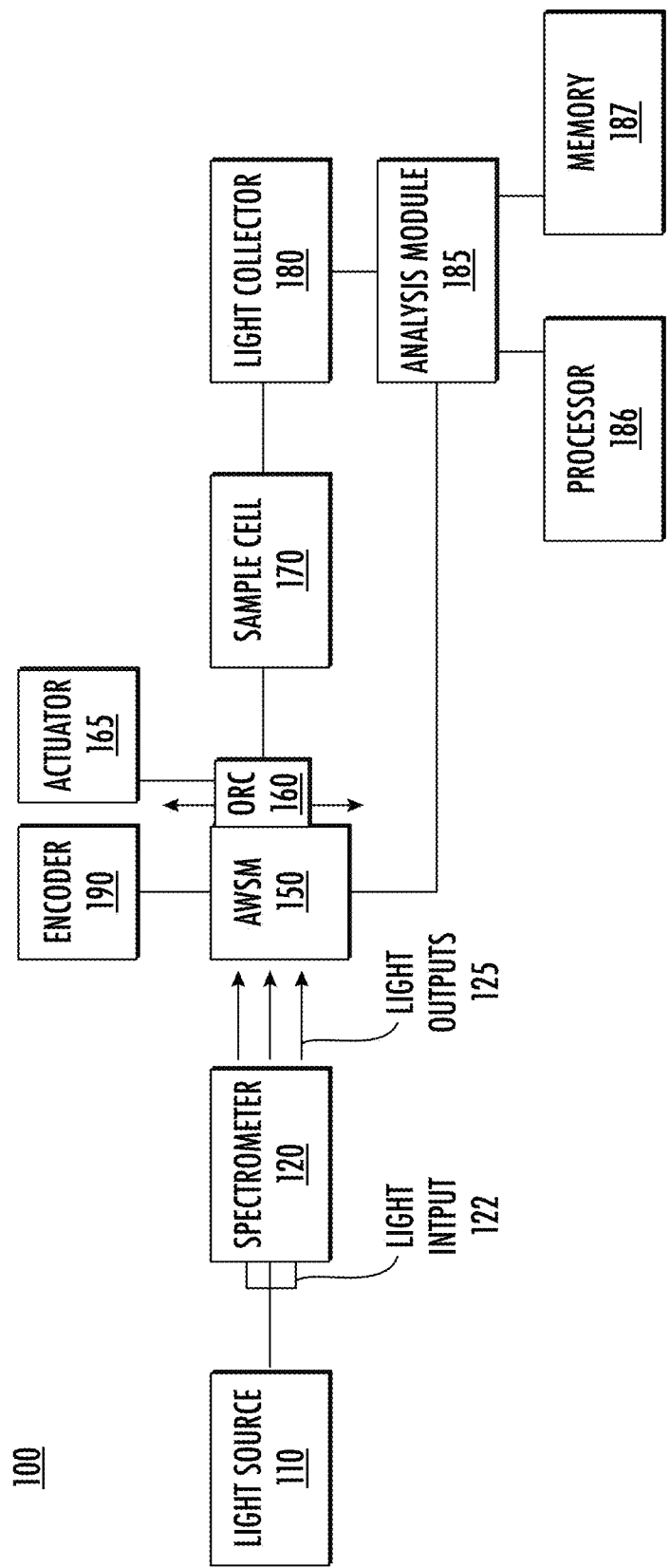
FIG. 2 is a schematic view of an example embodiment of a light source system for providing light to the variable path length system of FIG. 1 in accordance with one aspect of the present disclosure.
Figure 3:
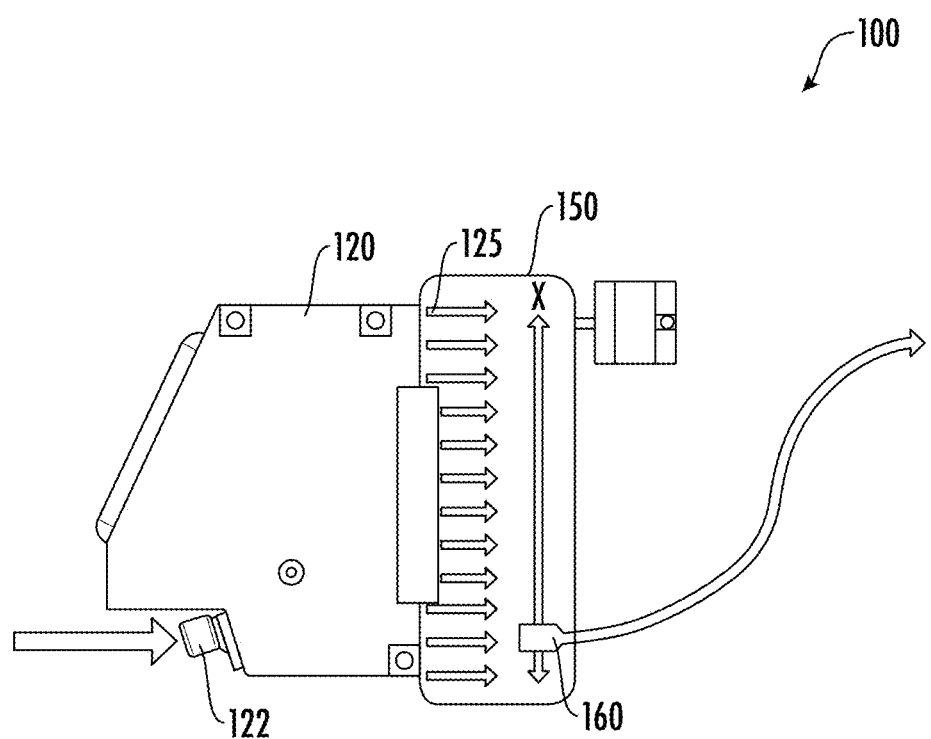
FIG. 3 is a schematic view of an example embodiment of a light source system for outputting light to the variable path length system of FIG. 1 in accordance with one aspect of the present disclosure.

Referring to FIGS. 2 and 3, in one example of an embodiment, the light source system 100 may include a light source 110 and a spectrometer 120. In use, the light source 110 may be positioned upstream of the spectrometer 120 and is arranged and configured to direct light into an input 122 of the spectrometer 120, which is arranged and configured to receive the light from the light source 110 and to split the light into a plurality of light outputs 125 each having a different wavelength $\lambda_1, \lambda_2, \lambda_3 \ldots \lambda_n$. Thus arranged, the light source system 100 overcomes the disadvantages of the prior art by providing a compact or mini spectrometer 120, which can be utilized to split the incoming light into different wavelengths with a desired high resolution ($\approx 0.15$ nm).

The light source 110 may be any suitable light source now known or hereafter developed. For example, in one non-limiting example embodiment, the light source 110 may be a Xenon light or LED light such as a monochromatic LED, though it will be appreciated that any other appropriate light source could be used. In use, the light may be transmitted to the input 122 of the spectrometer 120 via a fiberoptic element, although any suitable optical transmission mechanisms may be used.

As illustrated, the spectrometer 120 is positioned downstream of the light source 110 and is coupled to the light source to receive light therefrom. In use, the spectrometer 120 is arranged and configured to receive the light from the light source 110 and to split the light into a plurality of light outputs 125 each having a different wavelength $\lambda_1, \lambda_2, \lambda_3 \ldots \lambda_n$ (e.g., the spectrometer 120 receives the inputted light and splits the light into individual, separate outputs with each output having a different wavelength $\lambda_1, \lambda_2, \lambda_3 \ldots \lambda_n$, which are then outputted to an Active Wavelength Selection Module 150, which will be described in greater detail below). In one embodiment, the spectrometer 120 is arranged and configured with a compact configuration and is arranged and configured to split the light into different wavelengths with a desired high resolution ($\approx 0.15$ nm).

As illustrated and as previously mentioned, in one embodiment, the light source system 100 includes an Active Wavelength Selection Module (AWSM) 150. In use, the AWSM 150 is configured to selectively receive one or more of the plurality of light outputs 125 via a selectively repositionable optical receiving component (ORC) 160. In one embodiment, the ORC 160 may be an optical fiber, a single element detector with sub-micron accuracy, a single optical fiber, an optical fiber array, or any other suitable light carrying component now known or hereafter developed. In one embodiment, the spectrometer 120 and/or the ORC 160 may be movable relative to each other by any suitable mechanism now known or hereafter developed. For example, in one embodiment, an actuator 165 such as, for example, a stepper motor, a solenoid motor, or any other mechanism or motor may be arranged and configured to provide verifiable incremental movement. In use, the AWSM 150 may include an actuator 165 coupled either directly or indirectly to the ORC 160 (as schematically shown in FIG. 2) to move the ORC with respect to the spectrometer 120. Alternatively, however, the actuator 165 may be coupled to the spectrometer 120 to move the spectrometer 120 with respect to the ORC 160 so that the desired light output is receivable by the ORC 160 from a selected one of the plurality of light outputs 125. In this manner, as will be described in greater detail below, the user can select or dial in the wavelength $\lambda_1, \lambda_2, \lambda_3 \ldots \lambda_n$ desired depending on the characteristic and/or sample being analyzed.

In use, the AWSM 150 is arranged and configured to act as an active and high precision actuation mechanism. In use, the AWSM 150 is arranged and configured to move the ORC 160 and the spectrometer 120 with respect to each other, such that the ORC 160 can collect light at one of a plurality of locations 125 along the spectrometer 120. As mentioned, each locations 125 can correspond to a desired output light wavelength $\lambda_1, \lambda_2, \lambda_3 \ldots \lambda_n$, so that by positioning the ORC 160 at a selected one of the plurality of locations 125, the ORC 160 collects light of a desired wavelength (e.g., by repositioning the ORC 160 to one of the positions 125 chosen from the plurality of positions 125, the user can accurately select the desired wavelength for each individual application).

For example, in one embodiment, the spectrometer 120 may include a plurality of outputted light locations 125 extending across a length thereof. In one non-limiting example embodiment, the scan length may correspond to output light wavelengths of between 100 nm to 1 mm. In other non-limiting example embodiments, the scan length may correspond to output light wavelengths of between 200 nm to 400 nm. It will be appreciated that these are merely examples and other scan lengths could be used. In use, the ORC 160 may be positioned anywhere along the scan length to select an individual wavelength that is appropriate for analyzing a particular sample. For example, in the illustrated embodiment of FIG. 3, the AWSM 150 may provide twelve individual light "selection" locations, although this is merely for illustration and is not intended to be limiting.

Thus arranged, by selectively moving, repositioning, or the like, one of the spectrometer 120 or the ORC 160, the user can select the desired wavelength of the light to be transmitted to the VPT system. As such, the system is arranged and configured to facilitate analysis of a variety of different sample types and concentrations. That is, by enabling the light wavelength to be adjusted, the system is arranged and configured to be used to analyze different samples requiring a variety of different light wavelengths. As will be appreciated by one of ordinary skill in the art, depending on the sample and, more particularly, the characteristic of the sample, being tested, a different wavelength is required in order to provide a desired analytical result. With the disclosed system and method, the user can simply select or dial in the desired wavelength to perform the particular analysis for the given sample. For example, a user may analyze a virus, a gene therapy, a cell therapy, a protein, an antibody, a bovine serum albumen (BSA), or the like, the user knows what wavelength is needed. For example, protein may require a wavelength of 280 nm, caffeine may require a wavelength of 272 nm, dye may require a wavelength of 310 nm or 412 nm. In use, the user can adjust the system to the particular wavelength needed to transmit the particular wavelength through the sample being analyzed, and thus obtain the necessary absorbance value. Thus arranged, the system is arranged and configured to enable multiple setups enabling the user to sample multiple absorption peaks (e.g., system enables scanning to find different absorption peaks at different wavelengths, to dial into the different wavelengths to get different peaks). Table 1 below identifies several non-limiting example absorption peaks for common materials.

| Materials | Wavelength |
|---|---|
| BSA | 280 nm |
| Caffiene | 272 nm |
| DNA/RNA | 260 nm |
| Dyes | 310 nm, |
|  | 639 nm |
| Aceton | 280 nm |
| PS80 | 235 nm |

As schematically shown in FIG. 2, the collected light can be transmitted by the ORC 160 through the sample cell 170 such as, sample vessel 30, to a collector, detector, or the like 180 such as, for example, detector 50. In use, the collector 180 may be positioned to collect a portion of light that passes through the sample cell or vessel 170, and to deliver the collected light to an analysis module 185, where the analysis module 185 is configured to determine a quantity of light transmitted through the sample and to correlate the transmitted light with a characteristic of the sample. In one non-limiting example embodiment, the analysis module 185 may be in the form of a VPL system. The analysis module 185 may include or be coupled to a processor 186 and memory 187. The processor 186 may also be coupled, either directly or indirectly, to the AWSM 150, the encoder 190, the actuator 165, and/or any other component of the system to enable automated control of one or more aspects of the system 100 or portions thereof.

As mentioned, the system may include an actuator configured to move the spectrometer 120 and ORC 160 with respect to each other so that light is receivable by the ORC 160 from a selected one of the plurality of light outputs 125 of the spectrometer 120. Thus, the actuator may be coupled to the spectrometer 120 to move the spectrometer with respect to the ORC 160. Alternatively, the actuator may be coupled to the ORC 160 to move the ORC with respect to the spectrometer 120. Further, the actuator may be coupled to both the ORC 160 and the spectrometer 120 to move both elements to adjust their relative position so that light is receivable by the ORC 160 from a selected one of the plurality of light outputs 125 of the spectrometer 120. In one embodiment, a scan length of the actuator may be from 100 nm to 1 mm, or in one non-limiting example embodiment from 200 nm to 400 nm of received light from the spectrometer 120

Figure 4:
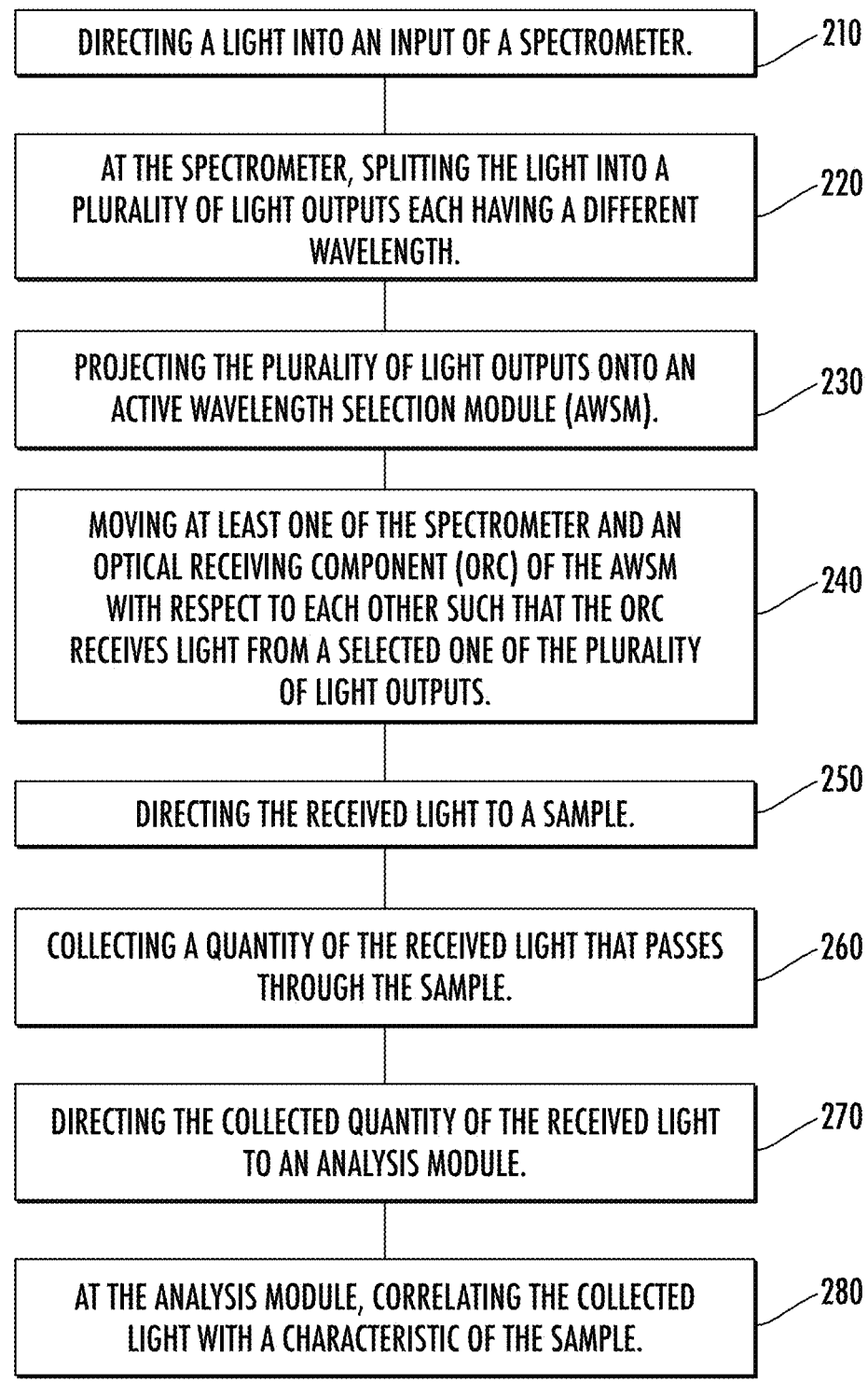
FIG. 4 is a flow chart of an example embodiment of a method for determining a characteristic of a sample in accordance with one aspect of the present disclosure.

Referring to FIG. 4, an example embodiment of a method for determining a characteristic of a sample 200 is disclosed. As illustrated, at step 210, light is directed into an input 122 of a spectrometer 120. At step 220, at the spectrometer 120, the light is split into a plurality of light outputs 125 each having a different wavelength $\lambda_1, \lambda_2, \lambda_3 \ldots \lambda_n$. At step 230, the plurality of light outputs 125 are projected onto an AWSM 150. At step 240, at least one of the spectrometer 120 and an ORC 160 of the AWSM 150 are moved with respect to each other such that the ORC 160 receives light from a selected one of the plurality of light outputs 125. At step 250, the received light is directed to a sample. At step 260, a quantity of the received light that passes through the sample is collected. At step 270, the collected quantity of the received light is directed to an analysis module 185. At step 280, at the analysis module 280, the collected light is correlated with a characteristic of the sample.

In one embodiment, in accordance with one or more aspects of the present disclosure, a calibration method for the disclosed system will now be described. In use, to obtain accurate measurements it is desirable to provide light at an accurate and repeatably selectable wavelength. To ensure such wavelength accuracy is obtained (e.g., to ensure that the wavelength being selected correlates to the wavelength being transmitted or outputted), the system may be calibrated to associate a particular wavelength of light received from the spectrometer 120 with a particular relative position between the spectrometer 120 and the ORC 160. In one example embodiment, the system may include an encoder 190, which may be mounted to the component that moves the ORC 160. The encoder 190 may be biaxially adjustable to provide longitudinal as well as up/down adjustments of the ORC 160. In use, the encoder 190 correlates the relative position of the spectrometer 120 and the ORC 160 with a particular wavelength of outputted light 125 by the spectrometer 120 and received by the ORC 160. The relative position information can be stored in memory 187 associated with a processor 186. By correlating and storing a plurality of positions and light wavelengths, a calibration library can be generated and stored in memory 187. As a result, when a user selects a particular light wavelength to be used with a particular sample under analysis, the system can use the calibration library to correlate the selected wavelength with a stored relative position between the spectrometer 120 and ORC 160. The encoder 190 can then instruct the actuator 165 (e.g., stepper motor or other device) to adjust the relative position between the spectrometer 120 and ORC 160 to a predetermined value so that the ORC 160 receives light from the spectrometer 120 at the particular light wavelength.

For example, in one embodiment, a calibration method may be initiated. With the ORC 160 positioned at a first location with respect to the spectrometer 120, the wavelength of the outputted light from the spectrometer 120 can be measured and stored in memory along with the encoder position associated with the first location. The ORC 160 can then be moved to a second location with respect to the spectrometer 120, and the wavelength of the outputted light from the spectrometer 120 can be measured and stored in memory along with the encoder position associated with the second location. That is, the ORC 160 or spectrometer 120 moves in a scanning direction (e.g., the direction along which we move the ORC 160 with respect to the spectrometer 120). This process can be repeated for a plurality of relative positionings between the spectrometer 120 and the ORC 160, to build a library that includes a plurality of wavelength/position pairs. Once the library has been recorded, the user can select a desired wavelength for use with a particular sample, and the system can correlate that wavelength with a particular relative positioning between the spectrometer 120 and the ORC 160. The system can then move the spectrometer 120, the ORC 160, or both to achieve the predetermined position associated with the selected wavelength.

Figure 5:
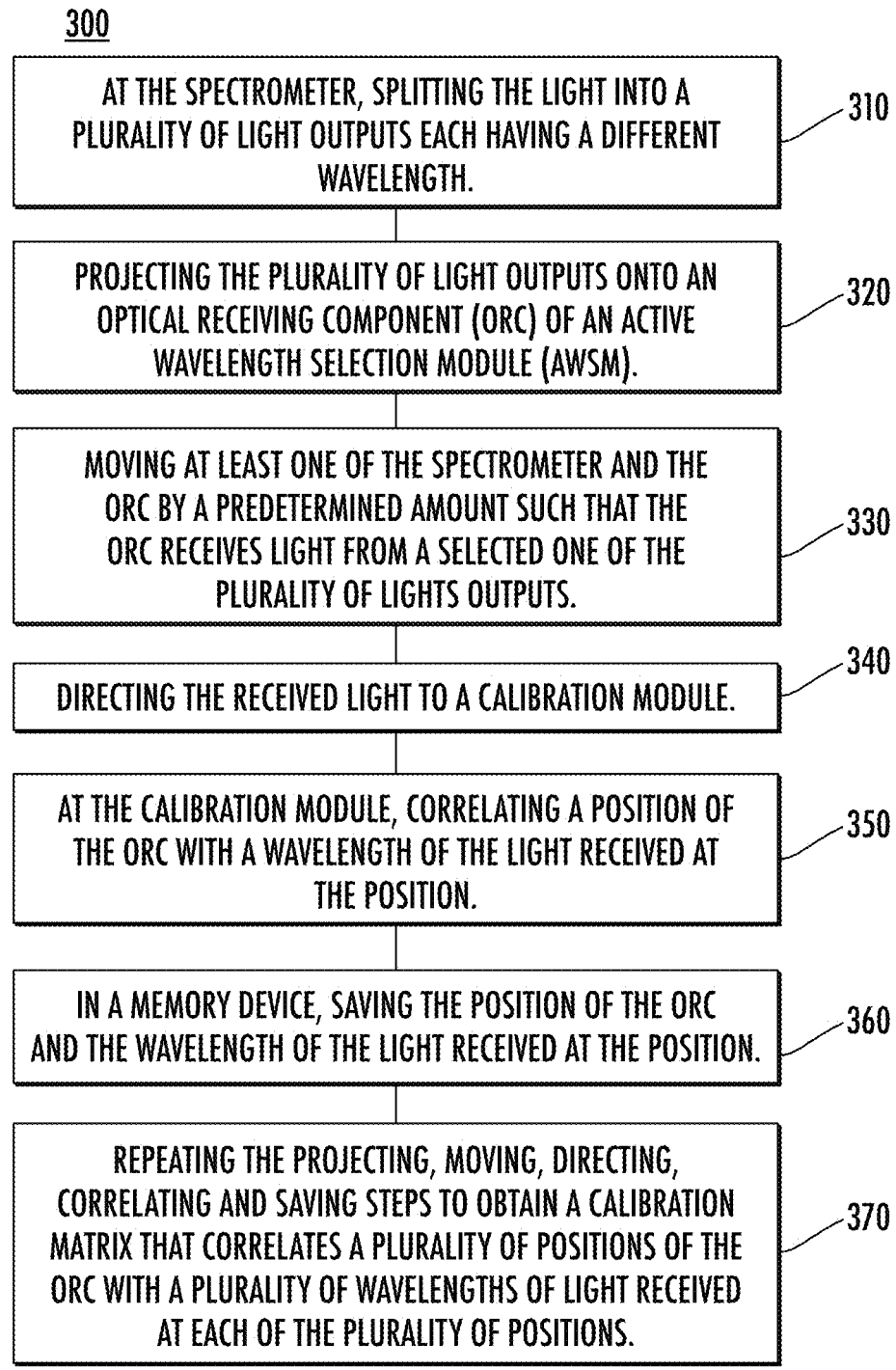
FIG. 5 is a flow chart of an example embodiment of a method for calibrating a selection mechanism for use in sample analysis in accordance with one aspect of the present disclosure.

Referring to FIG. 5, an example embodiment of a method for calibrating a selection mechanism for use in sample analysis 300 is disclosed. As illustrated, at step 310, at a spectrometer 120, input light is split into a plurality of light outputs 125 each having a different wavelength $\lambda_1, \lambda_2, \lambda_3 \ldots \lambda_n$. At step 320, the plurality of light outputs are projected onto an ORC 160 of an AWSM 150. At step 330, at least one of the spectrometer 120 and the ORC 160 are moved by a predetermined amount such that the ORC 160 receives light from a selected one of the plurality of light outputs 125. At step 340, the received light is directed to a calibration module. At step 350, at the calibration module, a position of the ORC 160 with a wavelength of the light received at the position is correlated. At step 360, in a memory device, the position of the ORC 160 and the wavelength of the light received at the position is stored. At step 370, steps 320 (projecting), 330 (moving), 340 (directing), 350 (correlating) and 360 (saving) are repeated to obtain a calibration matrix that correlates a plurality of positions of the ORC 160 with a plurality of wavelengths of light received at each of the plurality of positions.

In accordance with the present disclosure, a smaller, more compact (e.g., smaller footprint) light source 110 can be utilized adding to the systems portability. In addition, by incorporating aspects of the present disclosure, an easier to use, less complex system can be achieved. Moreover, the system provides a modular construct enabling various components to be built and assembled as needed.

Figure 6:
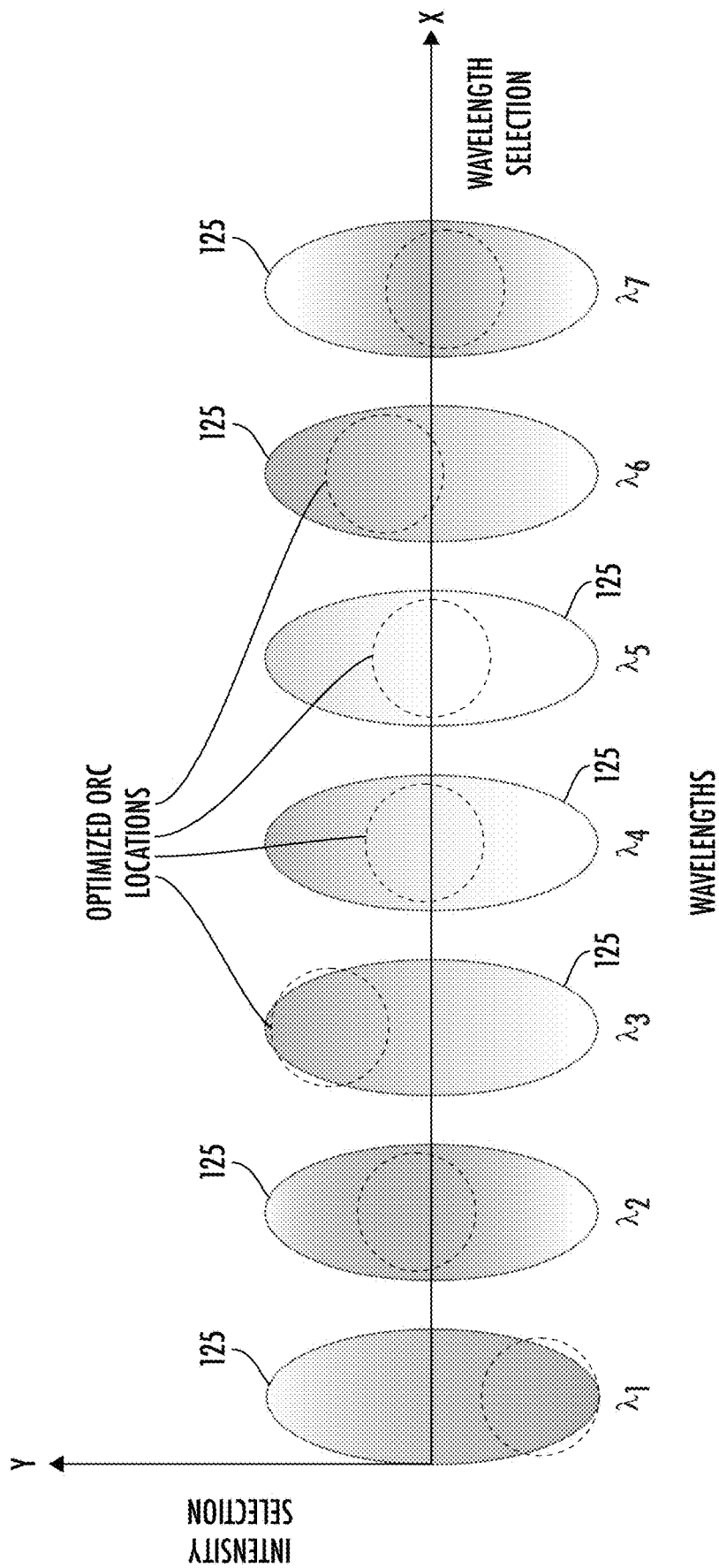
FIG. 6 is a schematic view of an example embodiment illustrating optimized ORC positions along a wavelength selection plane in order to obtain optimized light beam intensity from the spectrometer.

Referring now to FIG. 6, in accordance with another aspect of the present disclosure that may be used with other aspects disclosed herein, the system 100 may be configured to position the ORC 160 at a desired location with respect to each individual light beam 125 in order to maximize the amount of light received by the ORC 160 at each selected wavelength position. Such an arrangement can ensure the ORC 160 obtains consistent light intensity across a variety of wavelengths in order to minimize errors in sample measurements.

As will be appreciated, the profile of the light beams 125 emitted by the spectrometer 120 can have different shapes such as circular, oval, rectangular, etc., and the intensity of the light may not be uniformly distributed across the full beam shape. Thus, it can be desirable to position the ORC 160 at the location within each light beam at which the maximum light intensity exists. FIG. 6 illustrates a non-limiting embodiment in which the light outputs 125 emitted by the spectrometer at various wavelengths $\lambda_1, \lambda_2, \lambda_3 \ldots \lambda_n$ are oval in shape, and where an optimal light intensity (i.e., a maximum intensity) of each light output is located at a different position within each beam. For example, in the illustrated embodiment, the position of maximum light intensity can be located at a different position along the y-axis (axis perpendicular to the scanning axis) as compared to one or more other wavelength $\lambda_1, \lambda_2, \lambda_3 \ldots \lambda_n$.

Thus, in some embodiments, an additional degree of motion can be provided in or to the AWSM 150 or the spectrometer 120 to enable positional adjustment in the y-axis, thus enabling the system 100 to position the OCR 160 at the location of maximum light intensity at each wavelength position. By arranging the ORC 160 or spectrometer 120 to move in a direction (y-axis in FIG. 6) perpendicular to the scanning direction (x-axis in FIG. 6), the system can position the ORC 160 and/or spectrometer 120 to obtain the maximum beam intensity spot within each beam 125.

This optimal beam intensity positioning can be integrated into the calibration method described in relation to FIG. 5 so that, in addition to storing an scanning direction (x-axis) position of the OCR 160 for each desired wavelength $\lambda_1, \lambda_2, \lambda_3 \ldots \lambda_n$ an additional y-axis position of the OCR 160 is obtained and stored corresponding to the maximum light intensity for each desired wavelength. As a result, in operation, in addition to moving along the scanning axis (x-axis), the ORC 160 (or spectrometer 120) can be moved in a y-axis direction perpendicular to the scanning axis such that the ORC 160 is positioned at a maximum beam intensity location within the associated light beam 125.

As such, during calibration, start-up, or before measuring samples, the light intensity can be adjusted or optimized. This can be achieved by coupling the light beam at pre-defined wavelengths to the ORC 160 of the AWSM 150. By enabling adjustment of the light intensity, increased amounts of the transmitted light can be used for measuring the concentration of the sample thereby allowing wider range of sample measurement, such as higher sample concentrations.

It will be appreciated that the aforementioned arrangement is but one example of a manner to optimize light collection by the ORC, and other arrangements can be used. For example, it is envisioned that the light intensity could be adjusted by adjusting the light source 110, for example, by incorporating entrance and/or exit slits, appropriate optics, or the like.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A system for determining a characteristic of a sample, the system comprising:
    a light source positioned to direct light into an input of a spectrometer, the spectrometer positioned to receive the light from the light source and to split the light into a plurality of light outputs each having a different wavelength;
    an active wavelength selection module (AWSM) comprising an optical receiving component (ORC);
    an actuator coupled to at least one of the spectrometer and the ORC to selectively adjust a relative position between the spectrometer and the AWSM along a scanning direction so that light is receivable by the ORC from a selected one of the plurality of light outputs, wherein the ORC is configured to direct the received light to a sample; and
    a collector positioned to collect a portion of light that passes through the sample, and to deliver the collected light to an analysis module;
    wherein the actuator is configured to selectively adjust the ORC in a direction perpendicular to the scanning direction to position the ORC with respect to the selected one of the plurality of light outputs at a location within the selected one of the plurality of light outputs at which a desired light intensity exists; and
    wherein the analysis module is configured to determine a quantity of light transmitted through the sample and to correlate transmitted light with a characteristic of the sample.

2. The system of claim 1, wherein the actuator is configured to selectively adjust a relative position between the ORC and the spectrometer such that the desired light intensity is a maximum light intensity within the selected one of the plurality of light outputs.

3. The system of claim 1, wherein the ORC comprises a single optical fiber or an optical fiber array.

4. The system of claim 1, wherein the characteristic of the sample is at least one of a concentration, an extinction coefficient, a scattering, or a color, of a targeted compound in the sample.

5. The system of claim 4, wherein the targeted compound is at least one of a protein, an antibody, a virus, a gene therapy, a cell therapy, a bovine serum albumen (BSA), a vaccine, a virus from Gene and Cell therapy drugs, DNA, RNA, cell ratios, antibody conjugates, beer, wine, and surfactants.

6. The system of claim 1, wherein the analysis module includes a variable path-length instrument.

7. The system of claim 1, wherein a scan length of the actuator is from 100 nm to 1 mm of received light from the spectrometer.

8. A wavelength selection mechanism for use in sample analysis, the wavelength selection mechanism comprising:
    a spectrometer for receiving light from a light source and for outputting light at a plurality of different wavelengths;
    an optical receiving component (ORC) for receiving the light outputted by the spectrometer; and
    an actuator coupled to one of the ORC and the spectrometer, the actuator configured to selectively adjust a relative position along a first axis between the ORC and the spectrometer such that the ORC receives a selected one of the plurality of light outputs, the selected one of the plurality of light outputs having a wavelength for determining a targeted compound in the sample, and wherein the actuator is configured to adjust a relative position along a second axis perpendicular to the first axis to position the ORC with respect to the selected one of the plurality of light outputs at a location within the selected one of the plurality of light outputs at which a desired light intensity exists.

9. The wavelength selection mechanism of claim 8, wherein the actuator is configured to selectively adjust a relative position between the ORC and the spectrometer such that the desired light intensity is a maximum light intensity within the selected one of the plurality of light outputs.

10. The wavelength selection mechanism of claim 8, wherein the ORC comprises a single optical fiber or an optical fiber array.

11. The wavelength selection mechanism of claim 8, wherein the characteristic of the sample is at least one of a concentration, an extinction coefficient, a scattering, or a color, of a targeted compound in the sample.

12. The wavelength selection mechanism of claim 11, wherein the targeted compound is at least one of a protein, an antibody, and a virus.

13. The wavelength selection mechanism of claim 8, wherein the analysis module includes a variable path-length instrument.

14. The wavelength selection mechanism of claim 8, wherein a scan length of the actuator is from 100 nm to 1 mm of received light from the spectrometer.

15. A method for determining a characteristic of a sample, comprising:
   directing a light into an input of a spectrometer;
   at the spectrometer, splitting the light into a plurality of light outputs each having a different wavelength;
   projecting the plurality of light outputs onto an active wavelength selection module (AWSM);
   moving at least one of the spectrometer and an optical receiving component (ORC) of the AWSM with respect to each other along a scanning direction such that the ORC receives light from a selected one of the plurality of light outputs;
   moving at least one of the spectrometer and the ORC of the AWSM with respect to each other in a direction perpendicular to the scanning direction to position the ORC with respect to the selected one of the plurality of light outputs at a location within the selected one of the plurality of light outputs at which a desired light intensity exists;
   directing the received light to a sample;
   collecting a quantity of the received light that passes through the sample;
   directing the collected quantity of the received light to an analysis module; and
   at the analysis module, correlating the collected light with a characteristic of the sample.

16. The method of claim 15, wherein moving at least one of the spectrometer and the ORC comprises adjusting a relative position between the ORC and the spectrometer such that the desired light intensity is a maximum light intensity within the selected one of the plurality of light outputs.

17. The method of claim 15, wherein the ORC comprises a single optical fiber or an optical fiber array.

18. The method of claim 15, wherein the characteristic of the sample is at least one of a concentration, an extinction coefficient, a scattering, or a color, of a targeted compound in the sample.

19. The method of claim 18, wherein the targeted compound is at least one of a protein, an antibody, a virus, a gene therapy, a cell therapy, a bovine serum albumen (BSA), a vaccine, a virus from Gene and Cell therapy drugs, DNA, RNA, cell ratios, antibody conjugates, beer, wine, and surfactants.

20. The method of claim 15, wherein the analysis module includes a variable path-length instrument.

21. The method of claim 15, wherein a scan length of the actuator is from 100 nm to 1 mm of received light from the spectrometer.

22. A method for calibrating a selection mechanism for use in sample analysis, comprising:
   at a spectrometer, splitting input light into a plurality of light outputs each having a different wavelength;
   projecting the plurality of light outputs onto an optical receiving component (ORC) of an active wavelength selection module (AWSM);
   moving at least one of the spectrometer and the ORC along a scanning direction by a predetermined amount such that the ORC receives light from a selected one of the plurality of light outputs;
   moving at least one of the spectrometer and the ORC perpendicular to the scanning direction such that the ORC is positioned with respect to the selected one of the plurality of light outputs at a location within the selected one of the plurality of light outputs at which a desired light intensity exists;
   directing the received light to a calibration module;
   at the calibration module, correlating a position of the ORC with a wavelength of the light received at the position;
   in a memory device, saving the position of the ORC and the wavelength of the light received at the position; and
   repeating the projecting, moving at least one of the spectrometer and the ORC along a scanning direction, moving at least one of the spectrometer and the ORC perpendicular to the scanning direction, directing, correlating, and saving steps to obtain a calibration matrix that correlates a plurality of positions of the ORC with a plurality of wavelengths of light received at each of the plurality of positions.

23. The method of claim 22, wherein moving at least one of the spectrometer and the ORC perpendicular to the scanning direction comprises moving at least one of the spectrometer and the ORC such that the desired light intensity is a maximum light intensity within the selected one of the plurality of light outputs.

* * * * *